United States Patent [19]

Iwagaki et al.

[11] Patent Number: 5,508,783
[45] Date of Patent: Apr. 16, 1996

[54] PHOTOGRAPHIC PROCESSING SYSTEM

[75] Inventors: Masaru Iwagaki; Toshifumi Iijima, both of Hino, Japan

[73] Assignee: Konica Corporation, Tokyo, Japan

[21] Appl. No.: 185,410

[22] Filed: Jan. 24, 1994

[30] Foreign Application Priority Data

Jan. 25, 1993 [JP] Japan .................... 5-010094

[51] Int. Cl.⁶ .................... G03B 27/32; G03B 27/52
[52] U.S. Cl. .................... 355/40; 355/68; 355/69; 355/77; 355/41
[58] Field of Search .................... 355/40, 41, 77, 355/69, 68; 354/297, 345, 120; 358/302

[56] References Cited

U.S. PATENT DOCUMENTS

| | | | |
|---|---|---|---|
| 4,251,156 | 2/1981 | Zimmerman et al. | 355/41 |
| 4,823,163 | 4/1989 | Rollet et al. | 355/41 |
| 4,903,068 | 2/1990 | Shiota | 355/40 X |
| 4,965,626 | 10/1990 | Robinson et al. | 355/40 |
| 4,966,285 | 10/1990 | Otake et al. | 206/455 |
| 5,119,126 | 6/1992 | Tokuda | 355/41 |
| 5,124,742 | 6/1992 | Yoshikawa | 355/41 |
| 5,159,385 | 10/1992 | Imamura | 355/40 X |
| 5,168,303 | 12/1992 | Ikenoue et al. | 355/38 |
| 5,184,227 | 2/1993 | Foley | 354/120 |
| 5,194,892 | 3/1993 | Robison | 355/40 |
| 5,227,823 | 7/1993 | Shigaki | 355/77 |
| 5,244,528 | 9/1993 | Manico | 156/358 |
| 5,264,683 | 11/1993 | Yoshikawa | 235/375 |

*Primary Examiner*—D. Rutledge
*Attorney, Agent, or Firm*—Finnegan, Henderson, Farabow, Garrett & Dunner

[57] ABSTRACT

In an apparatus for handling a photographic roll film on order of a customer, the film carries the customer code on its recording layer. The printing device reads the customer code on the recording layer of the film and prints the customer code onto photographic papers and an index-print sheet. The customer codes on the film, the photographic papers, and the index-print sheet are compared to ascertain the customer's identification.

8 Claims, 13 Drawing Sheets

PHOTOGRAPHIC PROCESSING SYSTEM

BACKGROUND OF THE INVENTION

This invention relates to a photographic processing system capable of processing, such as developing and printing, an exposed photographic film and making a print.

Recently in the most popular photographic processing system, a photographic film photographed through a camera by a customer is photographically processed at a photofinisher (a socalled laboratory) through a photo-dealer and the resulting developed photographic film and the prints thereof are returned to the customer through the dealer again. To be more concrete, the customer brings the photographed film with him to the dealer. Then, he orders the development and prints of the film from the dealer. The dealer fills in the contents of the order in a development/print envelope (or a DP envelope) and puts the film in the envelope. The laboratory man goes around his assigned district to collect DP envelopes. The collected envelopes are then classified at the laboratory by the kinds of photographic films and customers' orders. An ID seal (that is an identification seal) is pasted on each of the DP envelope and film to identify the customer that placed the order. The film is then processed by developing and printing it. The resulting developed photographic film, prints and DP envelope are verified against each other according to the ID seal and are then sent back to the dealer with the photographic finishing charge calculated out. The customer pays the charge at the dealer and receives the developed film and prints.

It has recently become very complicated for a laboratory to perform the above-mentioned work such as the classification of kinds of films, the work for pasting ID seals on and the verification work, because the kinds of photographic films have been diversified, the conditions where customers photographed and exposed have been varied and customers' orders have also been variegated. The above-mentioned complicated works have raised such a problem that an erroneous photographic processing is caused, that a returning of an article to a customer is delayed, that labor is in short supply and that an operation cost is increased.

In recent years, on the other hand, a camera has greatly been improved to contribute to making a photographic opportunity wider. However, the photographing intention of a photographer who is a customer has not satisfactorily been reflected, so that a photographer has complained about the color, brightness and finished prints each being different from those intended by the photographer.

A photographic processing charge has been calculated out in a system such that the charge is calculated out after completing all the photographic process. The system has therefore been inattentive to a customer, because the customer has not been told the charge in advance and does not know the charge until he actually receives his finished film and prints.

A developed photographic film returned to a customer has been cut into every several picture-frames and put in a so-called negative film case. When the film is reprinted at a laboratory, it has been forced to work so complicatedly that the film pieces cut into every several picture-frames are spliced again to each other pieces and each picture-frame is then reprinted.

Further, when a customer requests a reprinting service, it is difficult and in inconvenient to find a subject picture-frame out of the negative film frames capable of hardly verifying the subject picture-frame, because the color and light-and-shade thereof are reversed.

SUMMARY OF THE INVENTION

Taking the above-mentioned present situation into consideration, it is, accordingly, an object of the invention to provide a photographic processing system in which not only every laboratory can improve the working efficiency and prevent an erroneous photographic process, but also every customer can satisfy to receive any various photographic print, to have an improved reflection of his photographing intention, to know a clear photographic processing charge and to readily place his order for making a reprint.

To achieve the above-mentioned object of the invention and in accordance with the purpose of the invention, as embodied and broadly described herein, the invention comprises;

photographic processing system for making a print by photographically exposing imagewise a photographic film to light and, at the same time, at least one of an exposure condition and a photographing intention information is recorded, from a camera, on an information recording layer of the film, processing, such as developing and printing, the film according to a customer's request, and making a print of the image.

To achieve the object of the invention, the invention also comprises a photographic processing system comprising means for recording the customer's code and request on the information recording layer of the film through an order receiving means, means for developing the film, means for printing an image recorded on the film, based on the exposure condition, photographing intention information and customer's code and request each recorded on the film, means for making an index print obtained of a reduction print of the images of the whole photographed picture frames, and means for inspecting and verifying the developed film, prints and index print, according to the customer's code;

The photographic processing system can comprise a means for recording the customer's code and request to an information recording layer of the film through an order receiving means and, at the same time, a means for displaying a prospective charge to be paid by the customer on the order receiving means.

In the photographic processing system, when photographically exposing imagewise the photographic film to light and, at the same time, when at least one of the exposure condition and photographing intention information is recorded, from the camera, on the information recording layer of the film, the information is recorded in an optical recording system, and when the information of the customer's code and request is recorded on the information receiving layer of the film through the order receiving means, the information is recorded in a magnetic recording system.

In the photographic processing system, the means for printing an image recorded on the film, based on the exposure condition, photographing intention information and customer's code and request each recorded on the film, the printing means comprises a printer having an optical reading means and a magnetic reading means.

In the photographic processing system, the means for printing an image recorded on the film, based on the exposure condition, photographing intention information and customer's code and request each recorded on the film, the printing means LATD-controls an area subject to print not narrower than 80% of the image area on a developed photographic film, when making a print having a picture-frame size different from a standard size.

In the photographic processing system, the means for developing the photographic film, the printing means and the inspecting and verifying means are each connected to a central control means.

An embodiment of the above-mentioned photographic processing system is provided with means for making an index print on which every image of the whole photographed picture-frame is reduction-printed and means for inspecting and verifying a developed photographic film, a print and the index print together, based on a subject customer's code. Accordingly, not only every laboratory can readily perform a print verification, but also every customer can simply and readily confirm, put in good order and place an order for reprinting his photographs.

Another embodiment of the above-mentioned photographic processing system is provided with means for recording a customer's code and request on an information-recording layer of a photographic film through an order receiving means and, at the same time, a means for displaying a prospective charge to be paid by the customer on the order receiving means. Accordingly, the embodiment has an advantage that the customer can know the prospective charge in advance he will be required to pay the point of time when he brings his photographed film with him to a photographic dealer and places an order.

In a further embodiment of the photographic processing system, when photographically exposing imagewise a photographic film to light and, at the same time, when at least one of an exposure condition and photographing intention information is recorded from a camera on an information recording layer of the film, the information is recorded in an optical recording system. Therefore, there is no risk of erroneously writing in the exposure condition and photographing intention information, and the optical recording unit has a simple structure as compared to a magnetic recording unit. Therefore, it can contribute to make a camera smaller in size. When the information of the customer's code and request are recorded on the information receiving layer of the film through the order receiving means, the information is recorded in a magnetic recording system. Therefore, not only a conventional labor for pasting an ID seal on individual photographic films and DP envelopes can be saved and a working efficiency can also be improved, but also a customer's order and request can be erased or replaced.

Yet another embodiment of the photographic processing system of the invention is provided with a means for making prints based on an exposure condition, photographing intention information, and customer's code and request and the printer of the printing means is provided with an optically reading means and a magnetic reading means. Therefore, the whole information required for making prints can be read from a subject photographic film. Accordingly, every laboratory does neither require any pre-print assortment, nor require any so-called negative film judgment made by a skilled worker, so that any erroneous photographic processing can be prevented. Further, when a printing condition determined by an information is stored in a magnetic recording layer of a photographic film, the printing condition can also be utilized for making a future reprint. In addition to the above, an information can further be sent to a means for verifying a developed photographic film, a print and an index print.

A still further embodiment of the photographic processing system is provided with means for making prints based on an exposure condition, photographing intention information, and customer's request each recorded on the photographic film, and the printing means LATD-controls an area subject to print of not narrower than 80% of the image area on a developed photographic film, when making a print of a picture-frame size different from a standard size. Therefore, any color intended by a photographer can be reproduced even on such a print as made in a trimming-zooming photography, a high-vision sized photography and a panorama sized photography.

An additional embodiment of the photographic processing system of the invention is provided with the photographic film developing means, the printing means and the inspecting and verifying means each of which is connected to the central control means. Therefore, not only the working progress can be confirmed and every information can be exchanged, but also any trouble and erroneous operation can be prevented, so that every laboratory can readily be controlled and managed.

DETAILED DESCRIPTION OF THE PREFERRED EMBODIMENT

Figure 1:
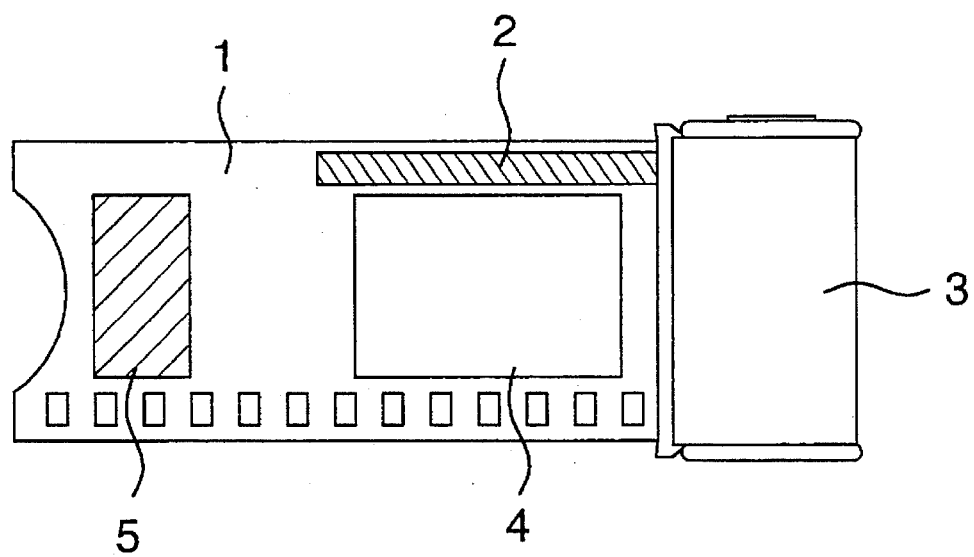
FIG. 1 is a plan view of a photographic film contained in a photographic film cartridge.

Some typical examples of the invention will now be detailed below. However, the embodiments of the invention shall not be limited thereto.

(Preparation of Support)

A dope was prepared by completely dissolving 100 parts of cellulose triacetate having an oxidation degree of 61.4% and 15 parts of triphenyl phosphate in 738 parts of a solvent mixedly comprising methylene chloride and methyl alcohol and then by adding a small amount each of the following organic dyes (a), (b) and (c).

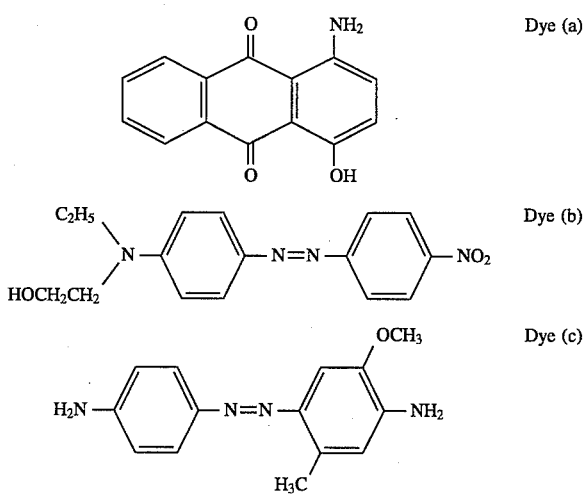

On the other hand, a cellulose triacetate dope containing magnetic particles was prepared in the following procedures.

| | |
|---|---|
| C0-coated $\gamma\text{-Fe}_2\text{O}_3$ (having a coercive force of 610 Oe, a BET surface area of 35 $m^2/g$, a longer axis length of 0.23 μm and a needle-shaped ratio of 7) | 100 parts by weight |
| Cellulose triacetate | 210 parts by weight |
| Methylene chloride | 2100 parts by weight |
| Methylethyl ketone | 1000 parts by weight |

The above-given compositions were mixed up together by making use of a dissolver and, thereafter, the mixture was dispersed by making use of a sand-grinder, so that a dispersion could be obtained. The viscosity thereof was measured by making use of a B-type viscometer and was proved to be 8.8 P.

The resulting dispersion was taken in an amount of 20 parts by weight and was then mixed up well with a dope having the following composition by making use of a dissolver.

| | |
|---|---|
| Cellulose triacetate | 13.8 parts by weight |
| Methylene chloride | 163.1 parts by weight |
| Cyclohexanone | 55 parts by weight |
| Ethanol | 3.1 parts by weight |

The resulting dope was filtrated and kept at 27° C. The dope was then uniformly flowingly spread through two flowingly spreading apertures provided each to a rotatable 6 m-length endless stainless steel band. The solvent was evaporated from the dope until the spread dope could be peeled off. Then the dope was peeled off from the stainless steel band and was further dried, so that a 85 μm-thick cellulose triacetate base containing magnetic particles could be obtained.

The resulting cellulose triacetate base containing magnetic particles was made to have a dried layer thickness of 1 μm and flowingly spread. Thereafter, the dope was dried while it was being aligned by making use of a counter-polar type magnet. The amount of the magnetic particles coated was set to be 50 $mg/m^2$.

The coercive force of the support was proved to be 670 Oe and the optical transmittance density thereof was proved to be 0.10.

On the surface of the resulting base, a subbed layer-coating solution comprising 20 g of gelatin, 40 g of water, 20 g of salicylic acid, 600 g of methanol, 1200 g of acetone and 200 g of methylene chloride was coated and then dried up.

The layers having the following compositions were each provided by coating them, in the order from the support side, on the side opposite to the magnetic particle-containing layer side.

| | |
|---|---|
| Layer 1 | |
| Alumina sol AS-100 (aluminum oxide) (manufactured by Nissan Chemical Ind. Co.) | 0.8 g |
| Layer 2 | |
| Diacetyl cellulose | 100 mg |
| Stearic acid | 10 mg |
| Silica fine particle (having an average particle size of 0.2 μm) | 50 mg |

(Preparation of Silver Halide Emulsion)

An octahedral silver iodobromide emulsion mainly having (111) planes was prepared in a double-jet process in accordance with the procedures described in Japanese Patent Publication Open to Public Inspection (hereinafter abbreviated to JP OPI Publication) No. 60-138538/1985.

With the resulting emulsion, an average grain size was proved to be 1.05 μm; a distribution range, 9%; a silver iodide content of each core, 30 mol %; a silver iodide content of each shell, 0.1 mol %; an average silver iodide content, 9 mol %; a relative standard deviation of the silver iodide contents among the emulsion grains, 17%; and a proportion of (111) planes, 98%; respectively. The resulting emulsion was named Em-A.

Sensitization of Silver Halide Emulsion

The resulting Em-A was sensitized in the following manner. The sensitizing dyes were each added in the following amounts per mol of silver halide to the emulsion at 60° C. After 20 minutes, sodium thiosulfate in an amount of $1.5\times10^{-6}$ mols and N,N-dimethyl selenourea in an amount of $5.0\times10^{-7}$ mols were added. The resulting emulsion was ripened for 60 minutes and, then, an aqueous solution mixedly containing chloroauric acid in an amount of $5.0\times10^{-7}$ mols and ammonium thiocyanate in an amount of $1.0\times10^{-4}$ mols was added thereto and the resulting emulsion was ripened successively for 30 minutes.

After completing the ripening treatment, stabilizer ST-1 and inhibitor AF-1 were added thereto in the amounts of 500 mg and 10 mg each per mol of silver halide, respectively.

(Preparation of Silver Halide Color Light-Sensitive Material)

Each of the layers having the following compositions was provided to the foregoing transparent support, so that Sample 101 of a multilayered color light-sensitive material was prepared.

(Composition of Light-Sensitive Layer)

The amounts of silver halide and colloidal silver coated were indicated by a unit of $g/m^2$ in terms of a metal silver content, the amounts of a coupler and an additive coated were indicated by a unit of $g/m^2$; and the amounts of sensitizing dyes coated were indicated by mols per mol of silver halide contained in one and the same layer.

| <Sample 101> | |
|---|---|
| Layer 1: An antihalation layer | |
| Black colloidal silver | 0.16 |
| UV absorbent (UV-1) | 0.20 |
| High boiling solvent (Oil-1) | 0.20 |

<Sample 101>

| | |
|---|---|
| Gelatin | 1.23 |
| Layer 2: An interlayer | |
| Compound (SC-1) | 0.15 |
| High boiling solvent (Oil-2) | 0.17 |
| Gelatin | 1.27 |
| Layer 3: A low-speed red-sensitive layer | |
| A silver iodobromide emulsion (having an average grain size of 0.38 μm and a silver iodide content of 8.0 mols) | 0.50 |
| A silver iodobromide emulsion (having an average grain size of 0.27 μm and a silver iodide content of 2.0 mols) | 0.21 |
| Sensitizing dye (SD-1) | $2.8 \times 10^{-4}$ |
| Sensitizing dye (SD-2) | $1.9 \times 10^{-4}$ |
| Sensitizing dye (SD-3) | $1.9 \times 10^{-5}$ |
| Sensitizing dye (SD-4) | $1.0 \times 10^{-4}$ |
| Cyan coupler (C-1) | 0.48 |
| Cyan coupler (C-2) | 0.14 |
| Colored cyan coupler (CC-1) | 0.021 |
| DIR compound (D-2) | 0.020 |
| High boiling solvent (Oil-1) | 0.53 |
| Gelatin | 1.30 |
| Layer 4: A medium-speed red-sensitive layer | |
| A silver iodobromide emulsion (having an average grain size of 0.52 μm and a silver iodide content of 8.0 mols) | 0.62 |
| A silver iodobromide emulsion (having an average grain size of 0.38 μm and a silver iodide content of 8.0 mols) | 0.27 |
| Sensitizing dye (SD-1) | $2.3 \times 10^{-4}$ |
| Sensitizing dye (SD-2) | $1.2 \times 10^{-4}$ |
| Sensitizing dye (SD-3) | $1.6 \times 10^{-5}$ |
| Sensitizing dye (SD-4) | $1.2 \times 10^{-4}$ |
| Cyan coupler (C-1) | 0.15 |
| Cyan coupler (C-2) | 0.18 |
| Colored cyan coupler (CC-1) | 0.030 |
| DIR compound (D-2) | 0.013 |
| High boiling solvent (Oil-1) | 0.30 |
| Gelatin | 0.93 |
| Layer 5: A high-speed red-sensitive layer | |
| A silver iodobromide emulsion (Em-A) | 1.27 |
| Sensitizing dye (SD-1) | $1.3 \times 10^{-4}$ |
| Sensitizing dye (SD-2) | $1.3 \times 10^{-4}$ |
| Sensitizing dye (SD-3) | $1.6 \times 10^{-5}$ |
| Cyan coupler (C-2) | 0.12 |
| Colored cyan coupler (CC-1) | 0.013 |
| High boiling solvent (Oil-1) | 0.14 |
| Gelatin | 0.91 |
| Layer 6: An interlayer | |
| Compound (SC-1) | 0.09 |
| High boiling solvent (Oil-2) | 0.11 |
| Gelatin | 0.80 |
| Layer 7: A low-speed green-sensitive layer | |
| A silver iodobromide emulsion (having an average grain size of 0.38 μm and a silver iodide content of 8.0 mols) | 0.61 |
| A silver iodobromide emulsion (having an average grain size of 0.27 μm and a silver iodide content of 2.0 mols) | 0.20 |
| Sensitizing dye (SD-4) | $7.4 \times 10^{-5}$ |
| Sensitizing dye (SD-5) | $6.6 \times 10^{-4}$ |
| Sensitizing dye (SD-6) | $6.6 \times 10^{-4}$ |
| Magenta coupler (M-1) | 0.41 |
| Colored magenta coupler (CM-1) | 0.12 |
| High boiling solvent (Oil-2) | 0.33 |
| Gelatin | 1.95 |
| Layer 8: A medium-speed green-sensitive layer | |
| A silver iodobromide emulsion (having an average grain size of 0.59 μm and a silver iodide content of 8.0 mols) | 0.87 |
| Sensitizing dye (SD-4) | $2.0 \times 10^{-5}$ |
| Sensitizing dye (SD-5) | $1.6 \times 10^{-4}$ |
| Sensitizing dye (SD-6) | $1.6 \times 10^{-4}$ |
| Magenta coupler (M-2) | 0.12 |
| Colored magenta coupler (CM-1) | 0.070 |
| DIR compound (D-2) | 0.025 |
| DIR compound (D-3) | 0.002 |
| High boiling solvent (Oil-2) | 0.10 |
| Gelatin | 1.00 |
| Layer 9: A high-speed green-sensitive layer | |
| Silver iodobromide emulsion (Em-A) | 1.27 |
| Sensitizing dye (SD-4) | $1.2 \times 10^{-5}$ |
| Sensitizing dye (SD-5) | $9.4 \times 10^{-5}$ |
| Sensitizing dye (SD-6) | $9.4 \times 10^{-5}$ |
| Magenta coupler (M-2) | 0.10 |
| Colored magenta coupler (CM-1) | 0.012 |
| High boiling solvent (Oil-2) | 0.10 |
| Gelatin | 1.00 |
| Layer 10: A yellow filter layer | |
| Yellow colloidal silver | 0.08 |
| Color-stain inhibitor (SC-1) | 0.15 |
| Formalin scavenger (HS-1) | 0.20 |
| High boiling solvent (Oil-2) | 0.19 |
| Gelatin | 1.10 |
| Layer 11: An interlayer | |
| Formalin scavenger (HS-1) | 0.20 |
| Gelatin | 0.60 |
| Layer 12: A low-speed blue-sensitive layer | |
| A silver iodobromide emulsion (having an average grain size of 0.38 μm and a silver iodide content of 8.0 mols) | 0.22 |
| A silver iodobromide emulsion (having an average grain size of 0.27 μm and a silver iodide content of 2.0 mols) | 0.03 |
| Sensitizing dye (SD-7) | $4.2 \times 10^{-4}$ |
| Sensitizing dye (SD-8) | $6.8 \times 10^{-5}$ |
| Yellow coupler (Y-1) | 0.75 |
| DIR compound (D-1) | 0.010 |
| High boiling solvent (Oil-2) | 0.30 |
| Gelatin | 1.20 |
| Layer 13: A medium-speed blue-sensitive layer | |
| A silver iodobromide emulsion (having an average grain size of 0.59 μm and a silver iodide content of 8.0 mols) | 0.30 |
| Sensitizing dye (SD-7) | $1.6 \times 10^{-4}$ |
| Sensitizing dye (SD-8) | $7.2 \times 10^{-5}$ |
| Yellow coupler (Y-1) | 0.10 |
| DIR compound (D-1) | 0.010 |
| High boiling solvent (Oil-2) | 0.046 |
| Gelatin | 0.47 |
| Layer 14: A high-speed blue-sensitive layer | |
| Silver iodobromide emulsion (Em-A) | 0.85 |
| Sensitizing dye (SD-7) | $7.3 \times 10^{-5}$ |
| Sensitizing dye (SD-8) | $2.8 \times 10^{-5}$ |
| Yellow coupler (Y-1) | 0.11 |
| High boiling solvent (Oil-2) | 0.046 |
| Gelatin | 0.80 |
| Layer 15: Protective layer 1 | |
| Silver iodobromide (having an average grain size of 0.08 μm and a silver iodide content of 1.0 mol %) | 0.40 |
| UV absorbent (UV-1) | 0.026 |
| UV absorbent (UV-2) | 0.013 |
| High boiling solvent (Oil-1) | 0.07 |
| High boiling solvent (Oil-3) | 0.07 |
| Formalin scavenger (HS-1) | 0.40 |
| Gelatin | 1.31 |
| Layer 16: Protective layer 2 | |
| Alkali-soluble matting agent (having an average particle size of 2 μm) | 0.15 |
| Polymethyl methacrylate (having an | 0.04 |

-continued

<Sample 101>

| | |
|---|---|
| average particle size of 3 μm) | |
| Lubricant (WAX-1) | 0.04 |
| Gelatin | 0.55 |

The above-mentioned light-sensitive material further contained compounds Su-1 and Su-2, a viscosity controller, layer hardeners H-1 and H-2, stabilizer ST-1, antifoggants AF-1 and AF-2 (having the weight average molecular weights of 10,000 and 1,100,000, respectively), dyes AI-1 and AI-2 and compound D-I-1 (in an amount of 9.4 mg/m$^2$).

The chemical structures of the following compounds will be given below; namely, UV-1, Oil-1, SC-1, Oil-2, SD-1, SD-2, SD-3, SD-4, C-1, C-2, CC-1, D-1, D-2, M-1, M-2, CM-1, D-3, SC-2, HS-1, SD-5, Y-1, SD-6, SD-7, SD-8, UV-2, Oil-3, WAX-1, Su-1, Su-2, H-1, H-2, AF-2, AI-1, AI-2 and compound DI-1.

Oil-1
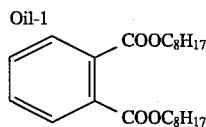

Oil-2
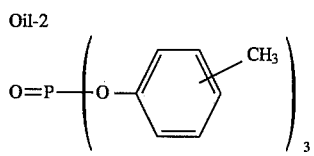

Oil-3
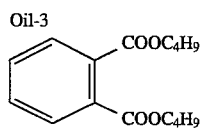

SC-1
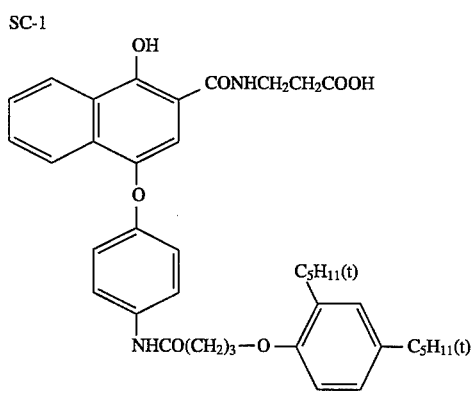

SC-2
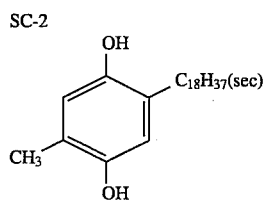

SD-1
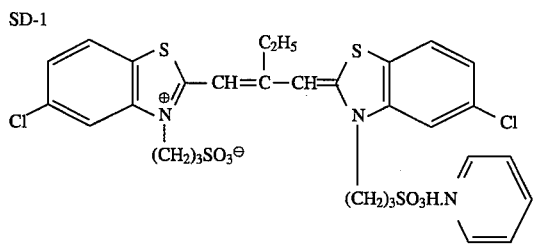

SD-2
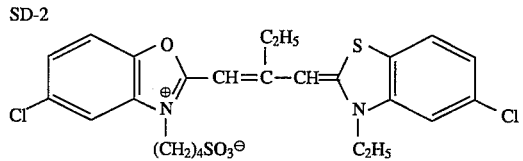

SD-3
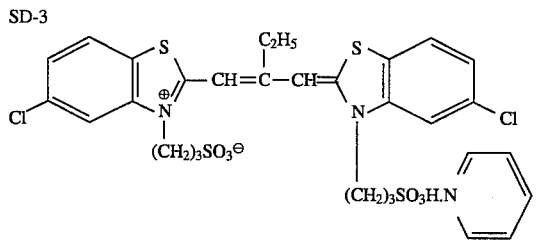

SD-4
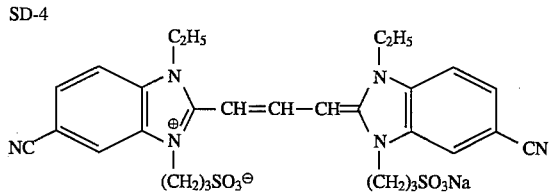

SD-5
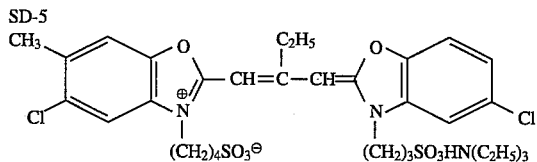

SD-6
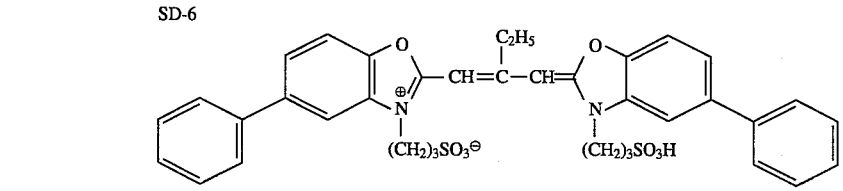

SD-7
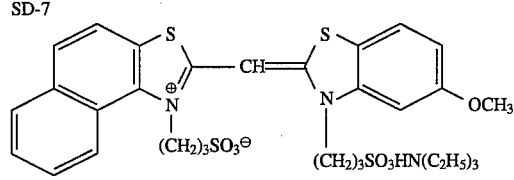
SD-8
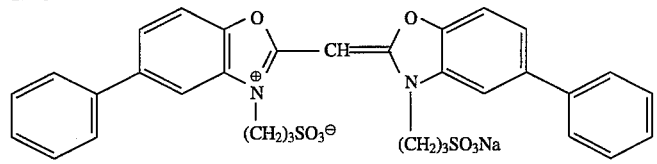
AF-2
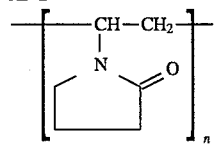
n: polymerization degree
DI-1 (A mixture of the following 3 components)
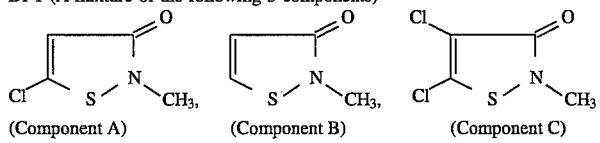
(Component A)   (Component B)   (Component C)
Components A:B:C = 50:46:4 (in terms of mol)
C-1
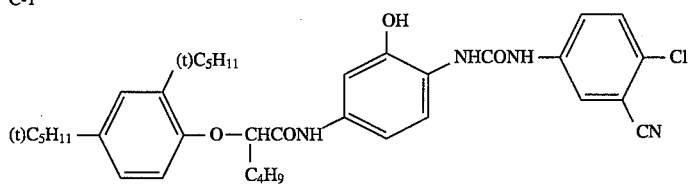
C-2
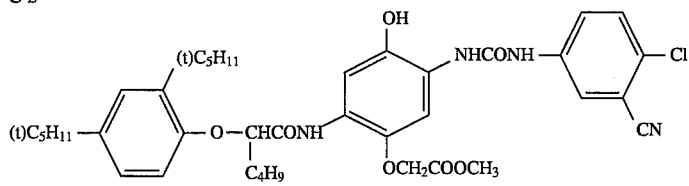
M-1
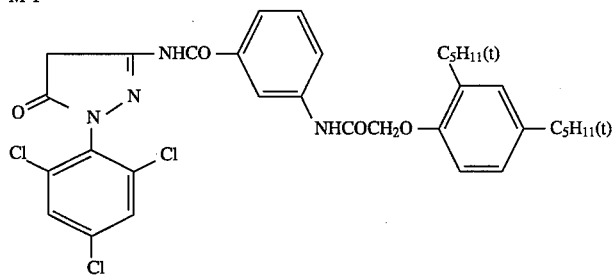

-continued
M-2
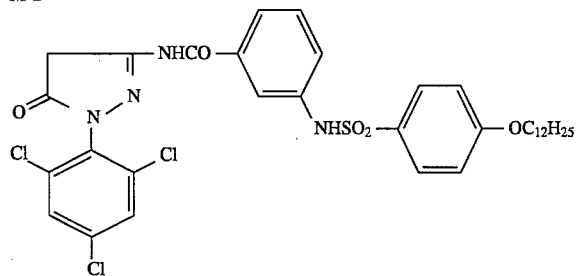
Y-1
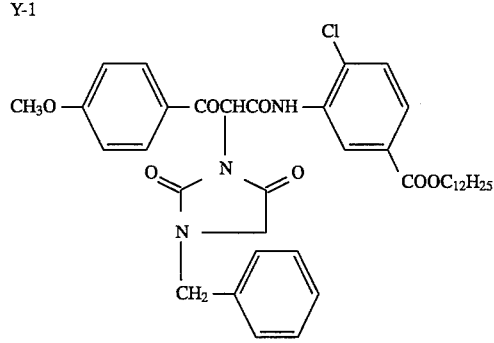
CC-1
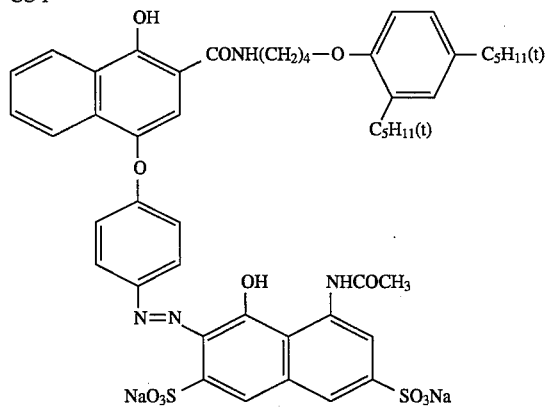
CM-1
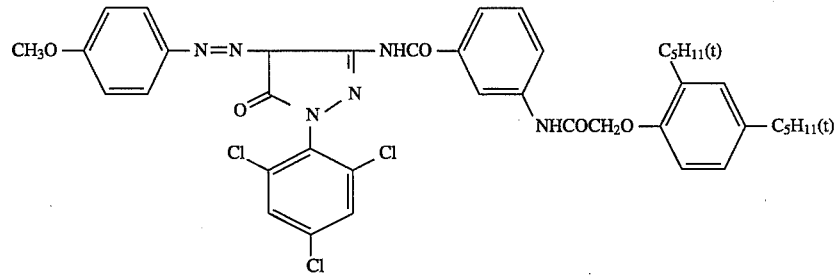
D-1
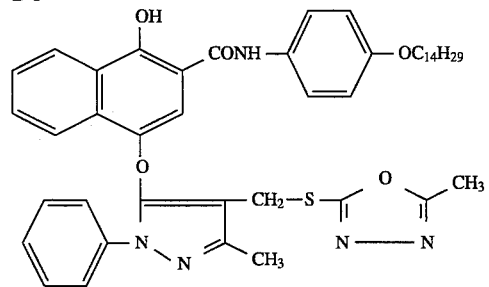
D-2
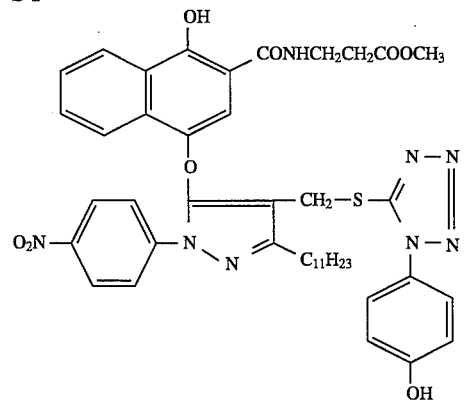

D-3
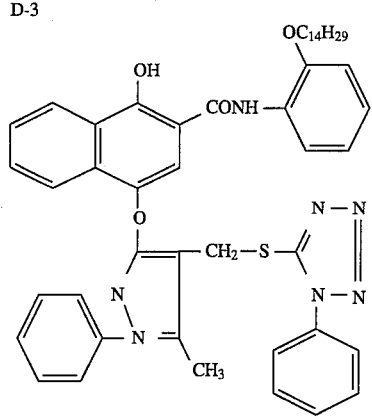
UV-2
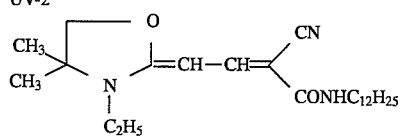
Su-1
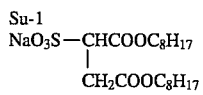
HS-1
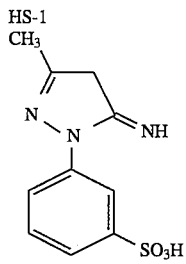
H-2
AI-1
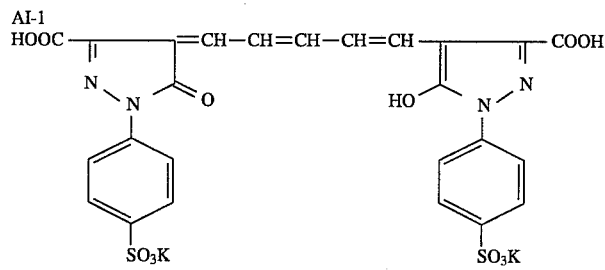
AI-2
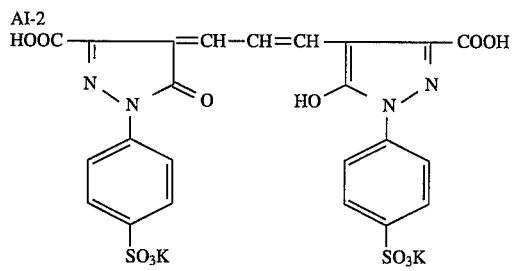
-continued
UV-1
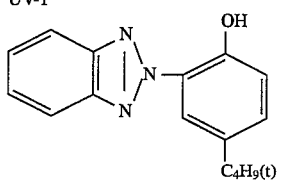
WAX-1
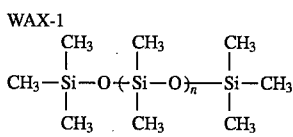
Weight average molecular weight Mw = 3,000
Su-2
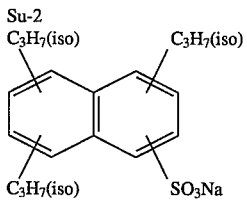
H-1
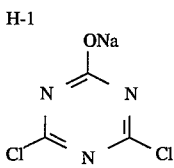

The resulting multilayered color light-sensitive material 101 was cut apart and rolled up in a specific film cartridge, as shown in FIG. 1 attached hereto.

The configuration of a photographic film of the invention was as shown in FIG. 1, that is, it was perforated only on one side thereof and was provided with a region (2) for recording an information sent from a camera on the other side thereof. To the information recording region, an optical recording was carried out in a dot-matrix system by a information recording light-source (that was a red-light emission type diode) provided to the photographing camera.

The contents for recording photographic information include, for example, a mark for starting an information recording, a designation of a print format, an information of the top or bottom of an image, an information on whether a flash-light is used or not, an exposure information, and a photographed date. The term, "a print format" stated herein means a format of a print such as an enlarged print made by a trimming zoom system or a print in a panorama or hi-vision size, that has a different aspect ratio of an image, when making a print on a printing paper from a developed negative film.

The leading edge of a photographic film of the invention was M-shaped as shown in FIG. 1, so that a photographic film loading can surely be performed into a camera without fail. Also, between the leading edge thereof and a photographed image (4), there was provided with region (5) for recording an information received from an order receiving means when a customer photographed and then placed an order for printing service.

Figure 2:
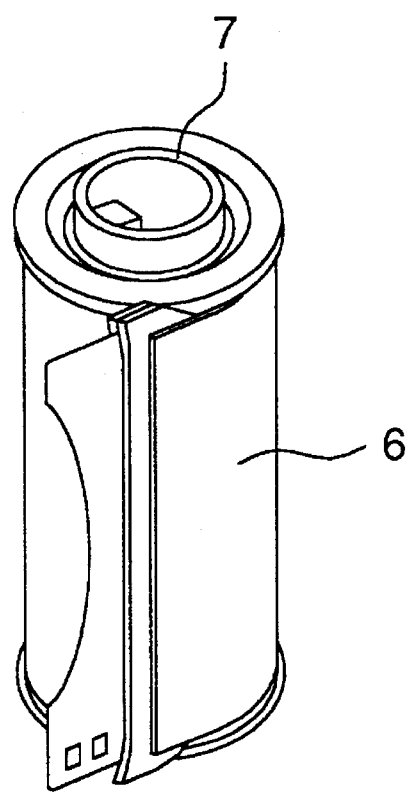
FIG. 2 is a perspective view of a photographic film contained in a photographic film cartridge.
Figure 3:
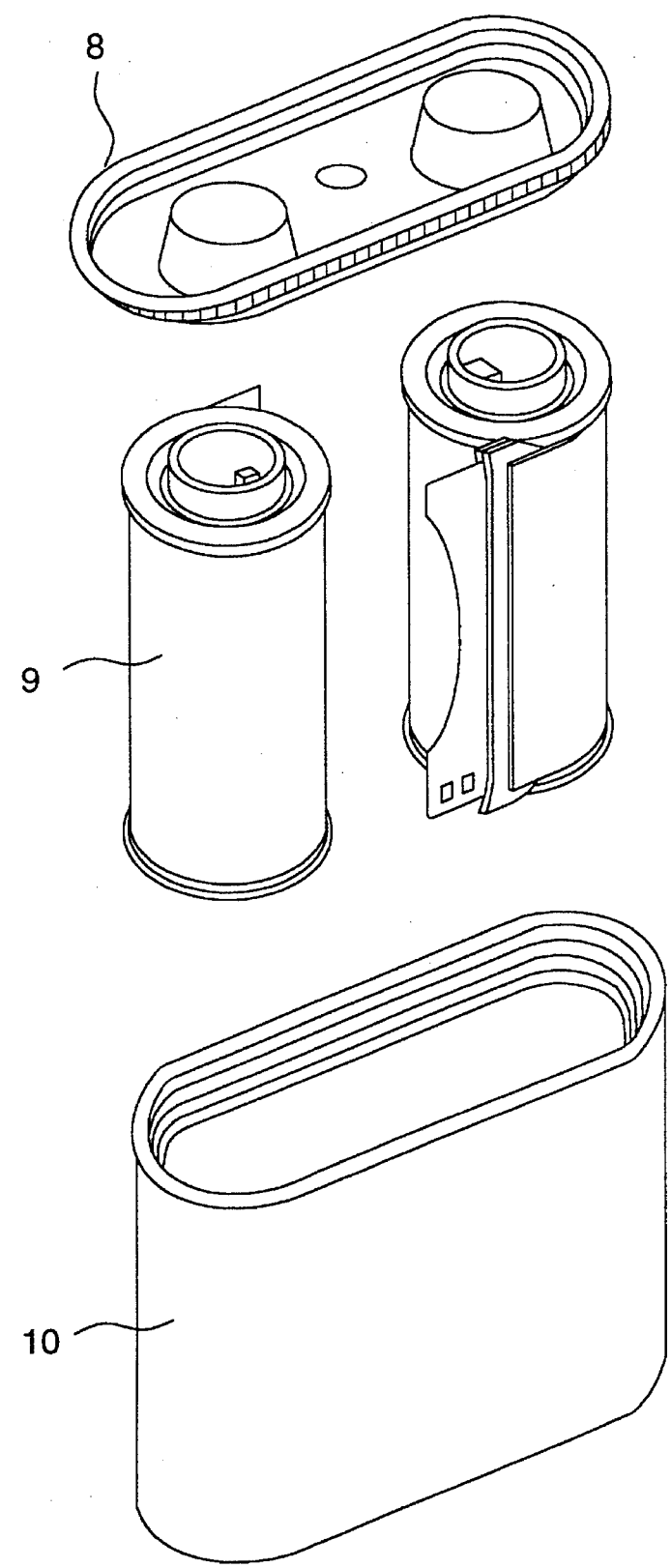
FIG. 3 is a sealed container of a photographic film cartridge.

In the invention, a photographic film was loaded in such a film cartridge (6) as shown in FIG. 2, that was smaller in size than the conventional 135 standard size. The dimensions of film cartridge (6) were an outer diameter of 20 mm, a length of 42 mm, an outer diameter of a spool of 10.8 mm and a length of the spool of 43 mm. Even the whole length of the film cartridge can also be shortened, because the hub (7) of a spool was made shorter than in the conventional hubs. Before a photographic film loaded cartridge is used, it was tightly packed in a photographic film cartridge container (10), as shown in FIG. 3.

Figure 4:
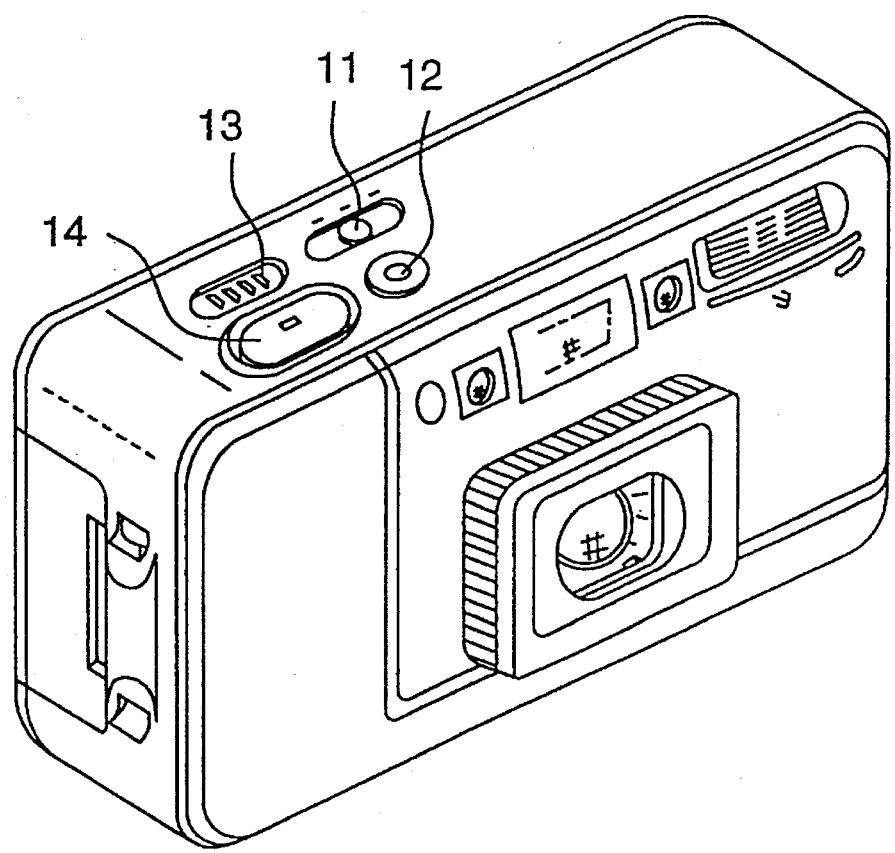
FIG. 4 is a perspective view of a camera.
Figure 5:
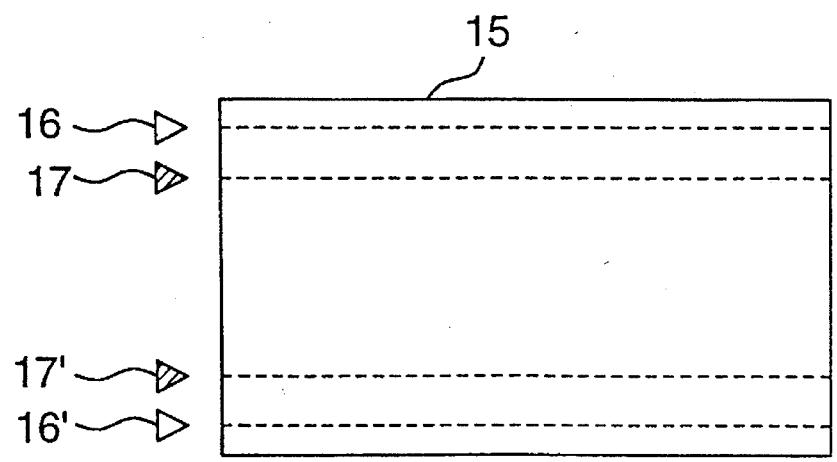
FIG. 5 is a constitution of the inside of a viewfinder frame.

In the invention, a photographing camera was such a small-sized camera as shown in FIG. 4. The camera is capable of performing a trimming zoom photography and also capable of designating panoramic and hi-vision sized photography. These types of photography can be switched over by operating switches (11) and (12) as shown in FIG. 4. When a photograph is taken upon designating a panoramic size or a hi-vision size, a corresponding photographing zone is displayed inside a viewfinder by an indicator (See FIG. 5). The indicator is sorted by colors, or example, by green for a panoramic size (17) and red for a hi-vision size (16) so that a photographer may not erroneously select a panoramic or hi-vision size.

Figure 6:
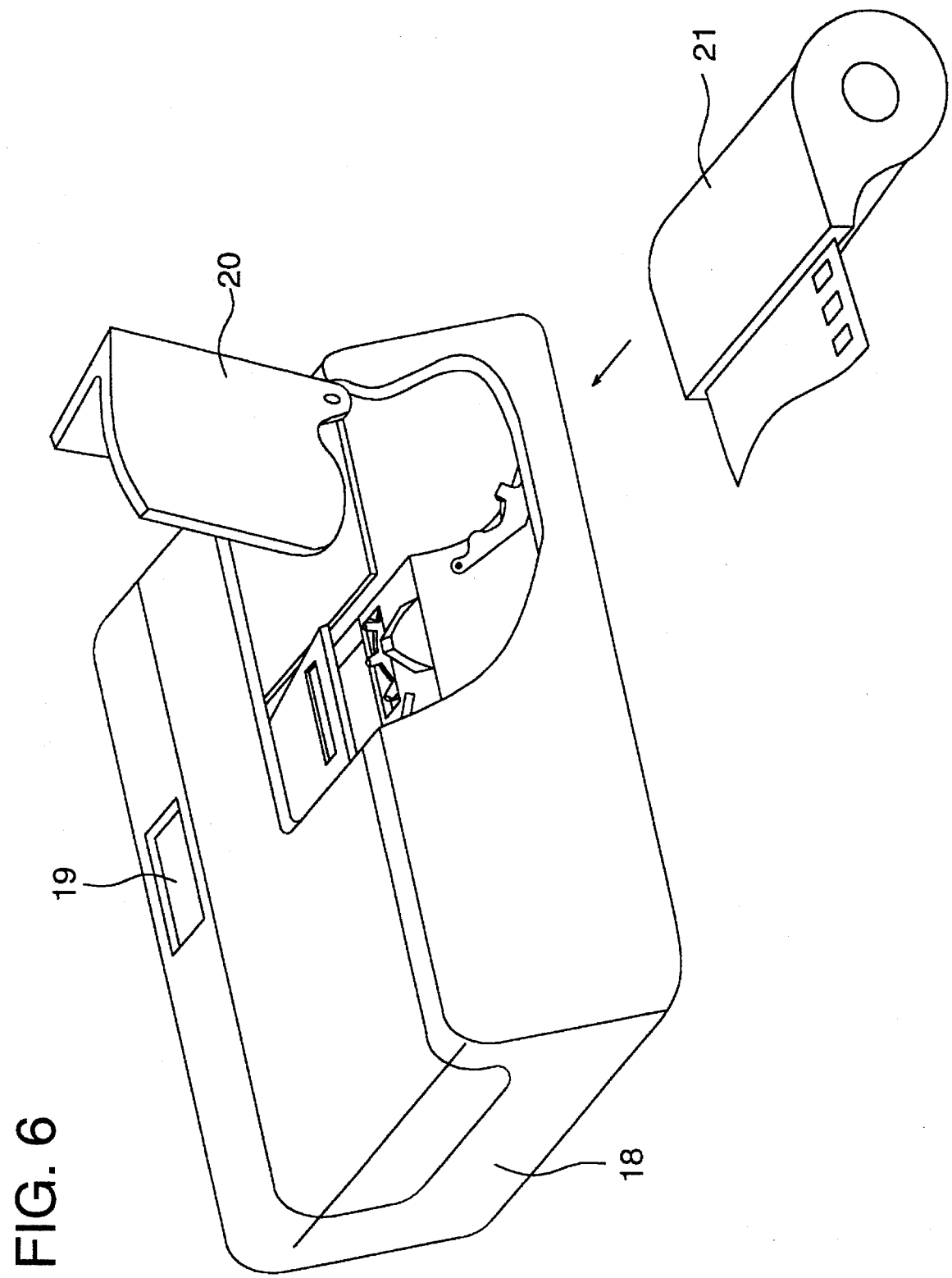
FIG. 6 is a perspective view of a camera back.

A photographic film of the invention loaded in a film cartridge can be loaded in a camera by a single-touch operation as shown in FIG. 6. It is therefore no longer required to manage any complicated operations such as pulling out the leading edge of a photographic film and then sitting it around the take-up spool of a camera. The elimination of such a complicated operation as mentioned above was achieved by adopting an automatic loading system in which a camera detects the leading edge of a photographic film and so drives the leading edge as to be taken up round a take-up spool.

Figure 7:
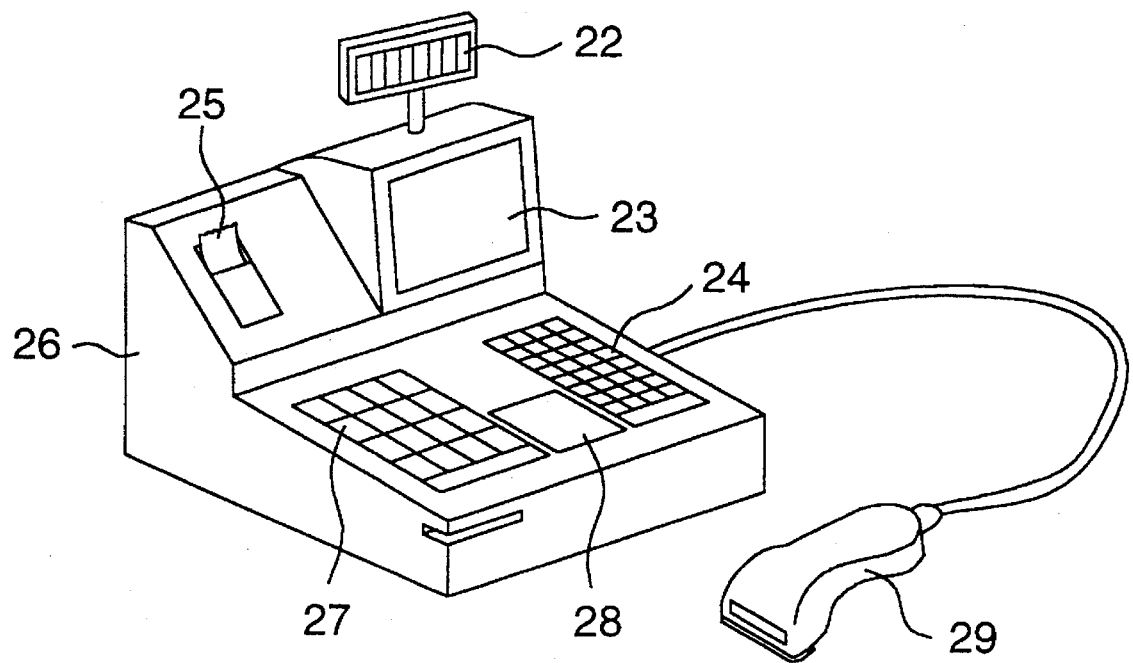
FIG. 7 is a perspective view of an order receiving means.

After completing a picture-taking on a photographic film of the invention, the contents of an order including, for example, a customer's code, the date and time of order received, a customer's request for processing services (such as only a development service, a development/print service at a time, or a negative print), a print size, the number of prints, expected date photofinished, and any remarks are each recorded on the designated zone provided to the leading edge area of the photographic film, at a photo-dealer by such an order receiving means as shown in FIG. 7. The leading edge of the film loaded in a film cartridge is pulled out by a film encoder (28) and the above-mentioned information is magnetically recorded on the designated area by a magnetic head. At this time, the magnetic head and the photographic film are both moved so that the relative speed thereof may be kept constant, thereby, any erroneous recording can be prevented. Also, an identification bar-code provided to the film cartridge surface can be read by a bar-code reader (29).

The above-mentioned contents of the order are inputted by the key-board (24) and touch-sensor (27) of the order receiving means and can be confirmed by the display appearing on CRT screen (23). When completing the inputting operation, a prospective charge to be paid by a customer is calculated based on the customer's request and is then displayed on displaying screen (22) and, at the same time, the customer's request and receipt (25) are printed out together and are then handed over to the customer as an exchange ticket for the delivery of the developed film and the prints.

Figure 8:
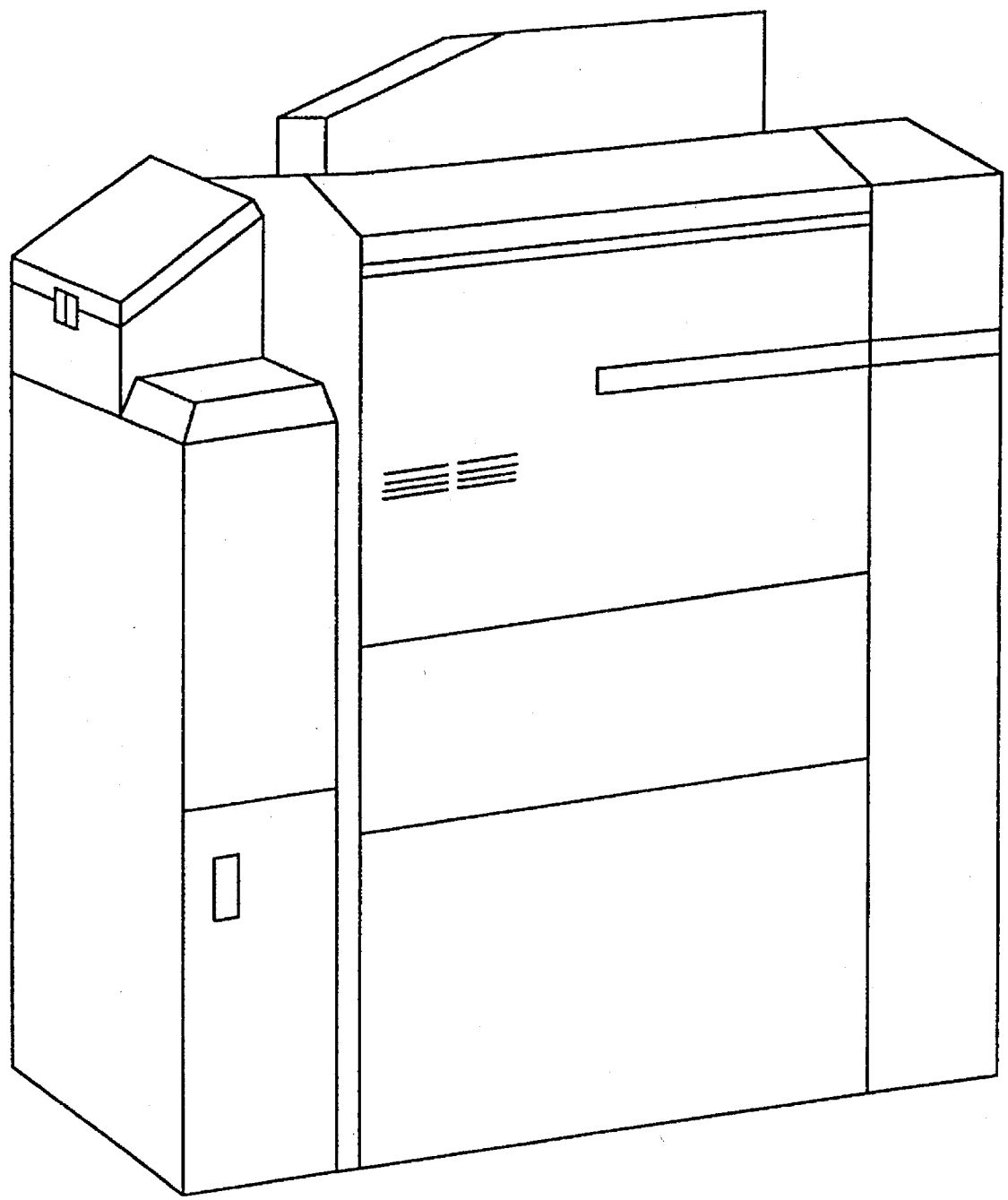
FIG. 8 is a perspective view of an automatic processor for processing photographic films.

An exposed, but not developed photographic film is developed through an automatic processor without assorting at a laboratory. The automatic processor shown in FIG. 8 is a machine compatible to both film cartridges in the foregoing smaller size and any conventional size, wherein a development can be progressed and completed only by setting a film cartridge thereon. The automatic processor has a magnetic reading device, so that the information recorded on a photographic film of the invention can be communicated one after another to a central control unit. The automatic processor shown in FIG. 8 is a modified film processor of Konica Nice-Print System NPS-1501QA (manufactured by Konica Corp.), wherein a Dry-to-Dry process can be performed for 7 minutes 30 seconds and capable of processing 32 rolls of film per hour.

Figure 9:
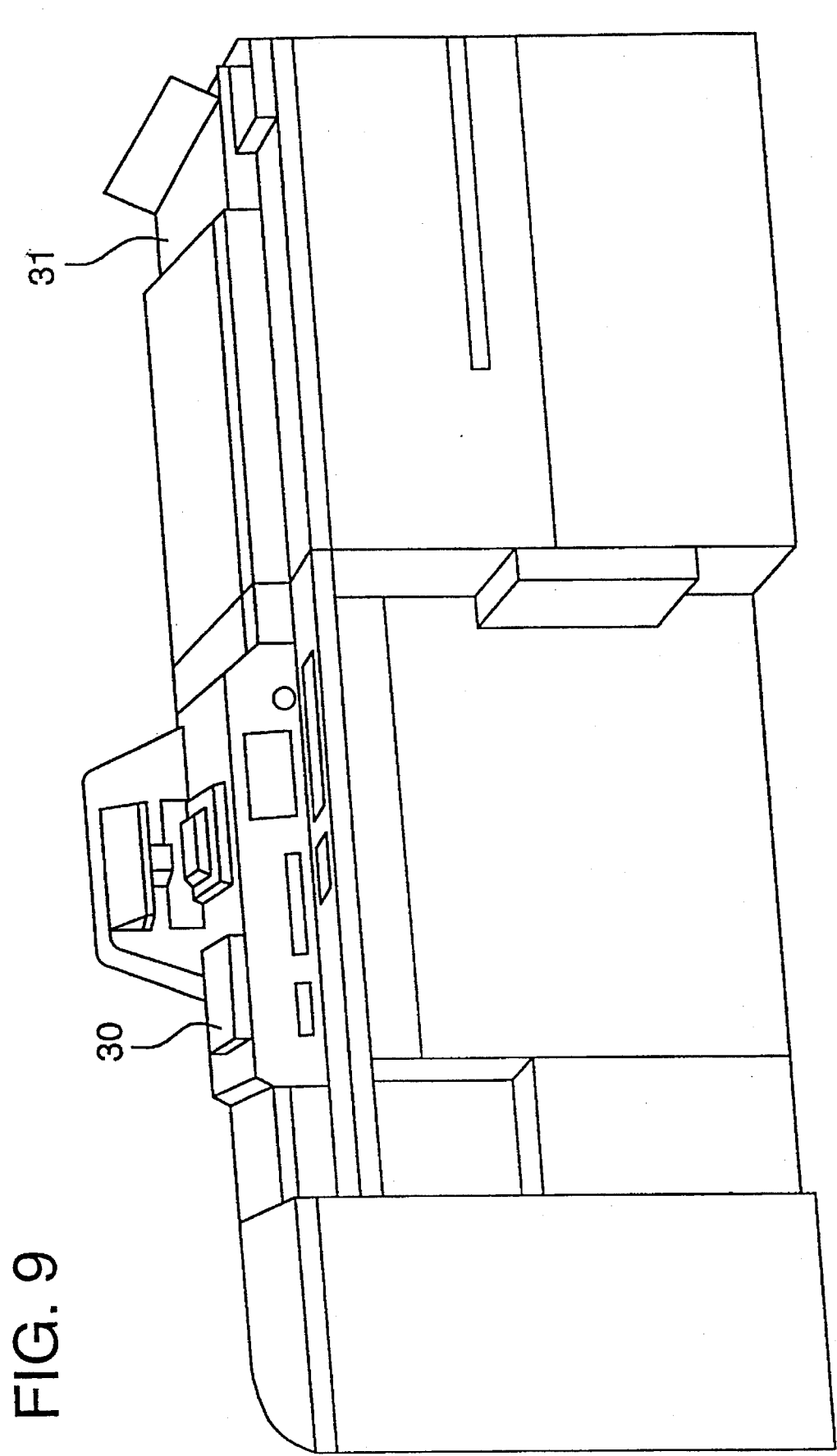
FIG. 9 is a perspective view of a printer.
Figure 10:
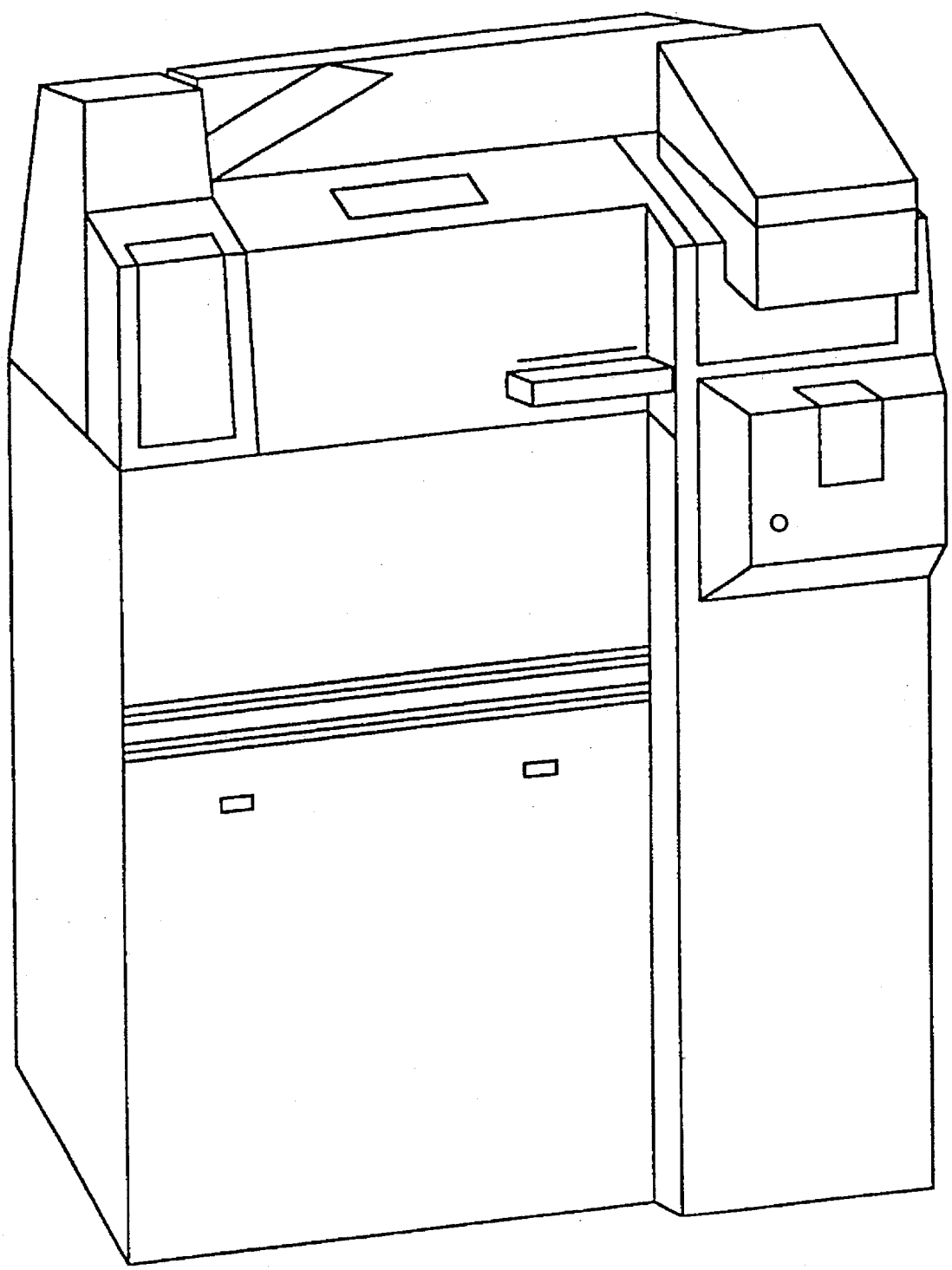
FIG. 10 is a perspective view of a printer attached with an automatic processor for processing photographic films.

A developed photographic film was printed by such a printer as shown in FIG. 9. An information reading unit (30) of the printer was provided with an optical reading means and a magnetic reading means. Based on an information, the corresponding printing conditions were determined and the photographic film was then printed. The information reading unit (30) was also provided with a magnetic writing means and, thereby, the printing conditions determined by the information were written on a magnetic recording layer of the photographic film, so that the written information were ready to use again for the next reprint. In a printing optical system, there provided with a zoom-lens for printing use and a variable aperture. Based on an information, the system was automatically operated, so that a print such as a trimming-zoom print, a hi-vision size print and a panoramic size print could be made. To a printed paper, a least one of the information was so printed as to serve as an inspection/verifying means (31). Also, a printing paper provided with a magnetic recording layer could be utilized for the above-mentioned purpose. The printer communicates the information of a photographic film one after another to a central control unit. The printer shown in FIG. 9 was a modified model of Konica Nice-Print System "Friendy", NPS-808SQA. As for a model comprising the above-mentioned automatic processor and printer in combination, there is such a modified Konica Big-Mini Lab CL-BM101 as shown in FIG. 10. In each of the systems, the paper developing section thereof was designed in a low processing solution replenishment system, a non-washing system and a non-overflow and non-waste solution system. In the systems,, for example, a Dry to Dry process can be made for 2 minutes 50 seconds and 1,000 sheets of standard size print can be processed per hour.

The above-mentioned printer was provided with a digital image processing function, an attached memory and a laser printing system. When a roll of photographic film was printed, every photographed picture frame was reduced in size and a sheet of index print (See FIG. 11) was printed out. The index print together with photographed picture frame (32), a customer's code (33) and an inspection/verification information (34) were printed. It may also produced separately by utilizing a photo-CD system.

An inspection/verification was carried out by an inspection/verification means comprising a magnetic reading means and an optical reading means, based on the information such as a customer's code and request each recorded on a developed photographic film and on an information printed on a print and an index print. The inspection/verification means communicates one after another to a central control unit.

Figure 12:
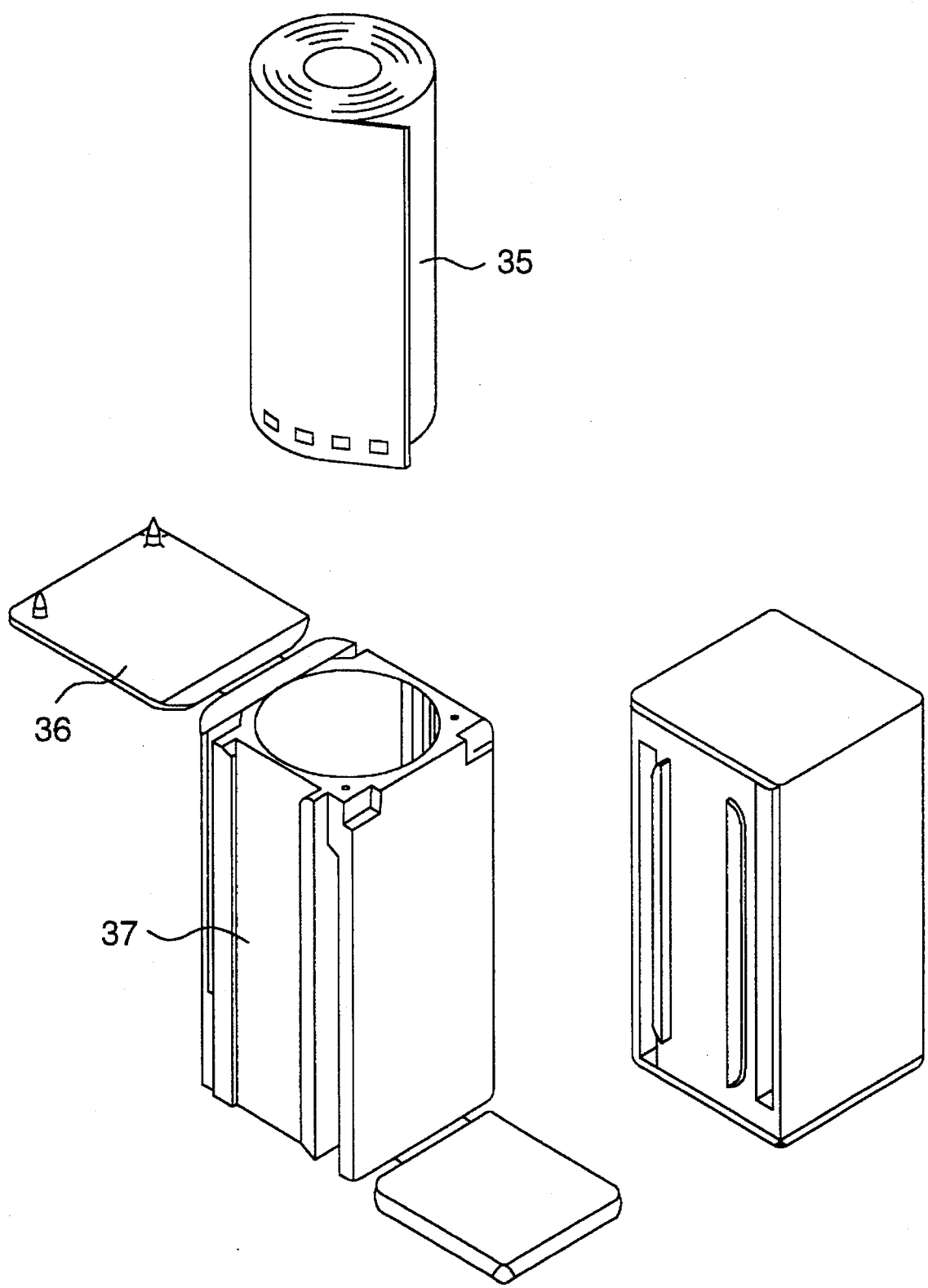
FIG. 12 is an exploded constitutional view of a container for storing a developed photographic film.
Figure 13:
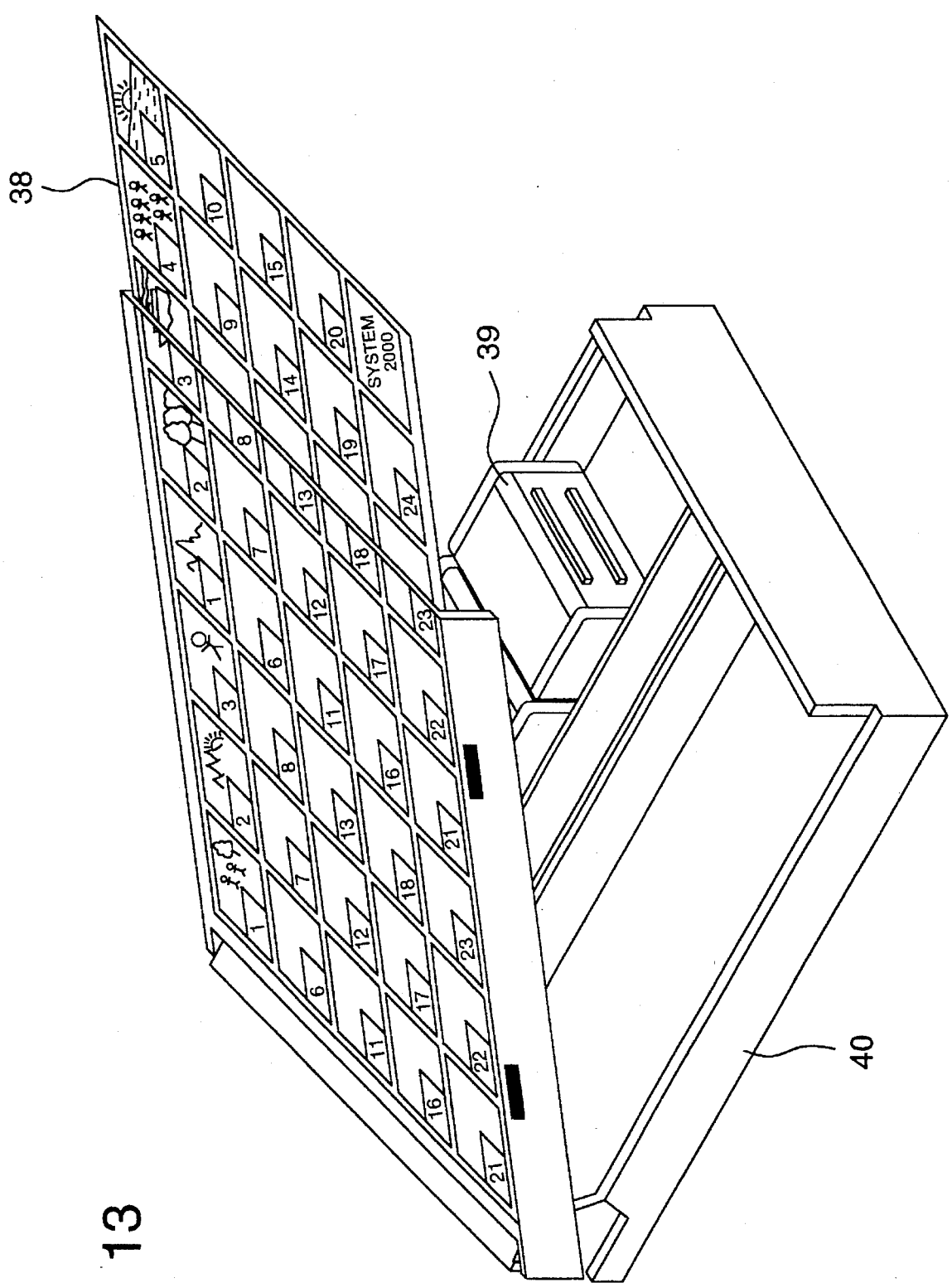
FIG. 13 is a perspective view of an exclusive case for storing developed photographic films and the index print thereof.
Figure 14:
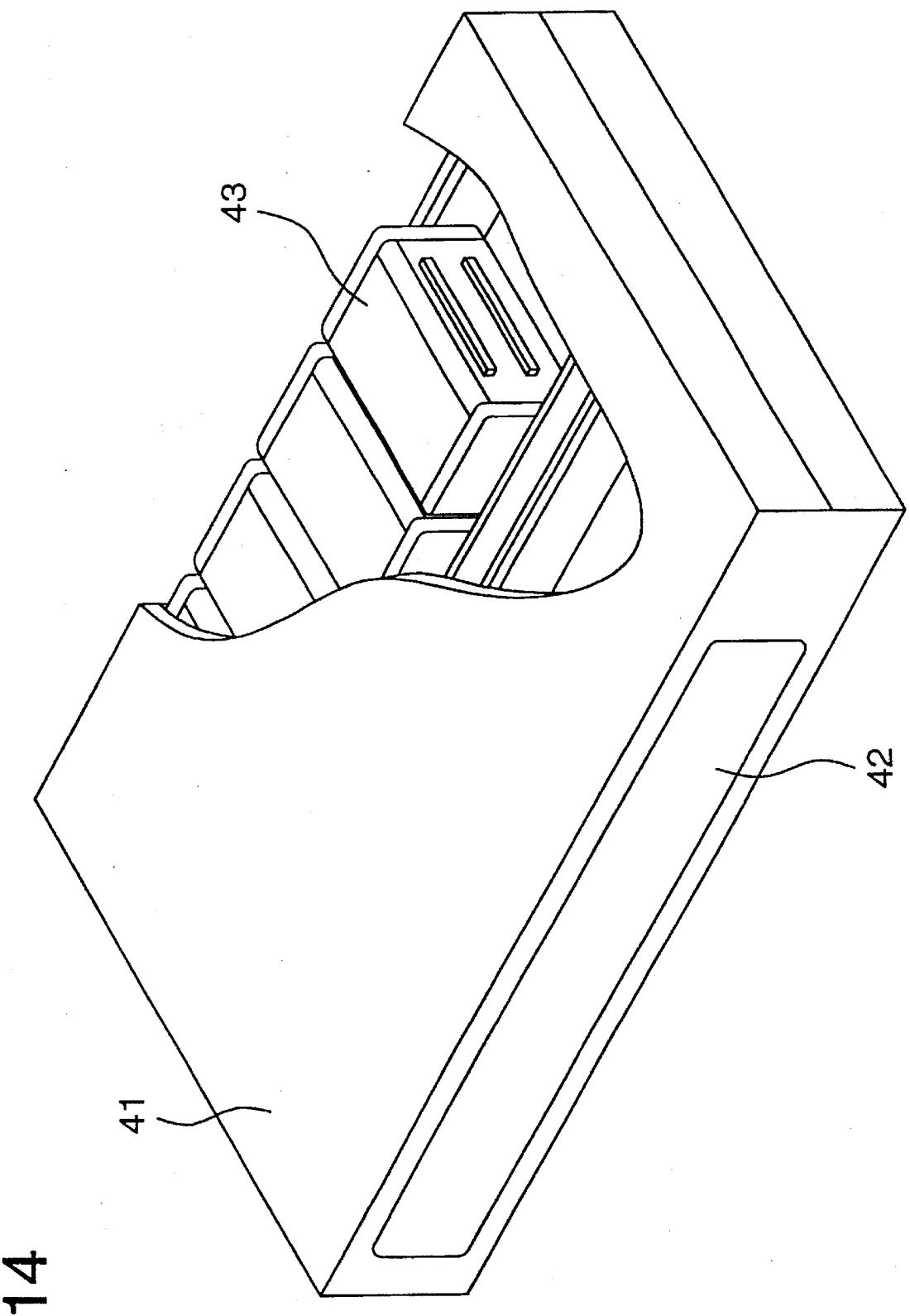
FIG. 14 is a partially exploded perspective view of an exclusive case for storing developed photographic films and the index print thereof.

A developed photographic film (35) remaining uncut is stored in a container (37) of the invention as shown in FIG. 12 and is then returned to the customer. When a laboratory received an order for reprint, the container, film and all, is inserted into the foregoing order receiving means, so that the contents of the corresponding order can be magnetically written in and the container, film and all, can be set directly to a printer at the laboratory. The customer's photographic films each stored in the container can be kept collectively in a case (40) or (41) for exclusive use shown in FIGS. 13 and 14 by the customer himself. The case for exclusive use can keep a dozen of photographic films therein and has also a slip-in pocket for inserting the index print. The case has the same length and breadth as in the VHS standard video-tap cassette. Therefore, the cases can be fitly put on a shelf for storing the video-tape cassettes.

A structural example of printing means which prints information about inspection and verification such as a customer code on papers on which images of each photographed frames are printed and on index print sheets on which images of photographed frames are printed through reduction will be explained as follows, referring to FIG. 15.

Figure 15:
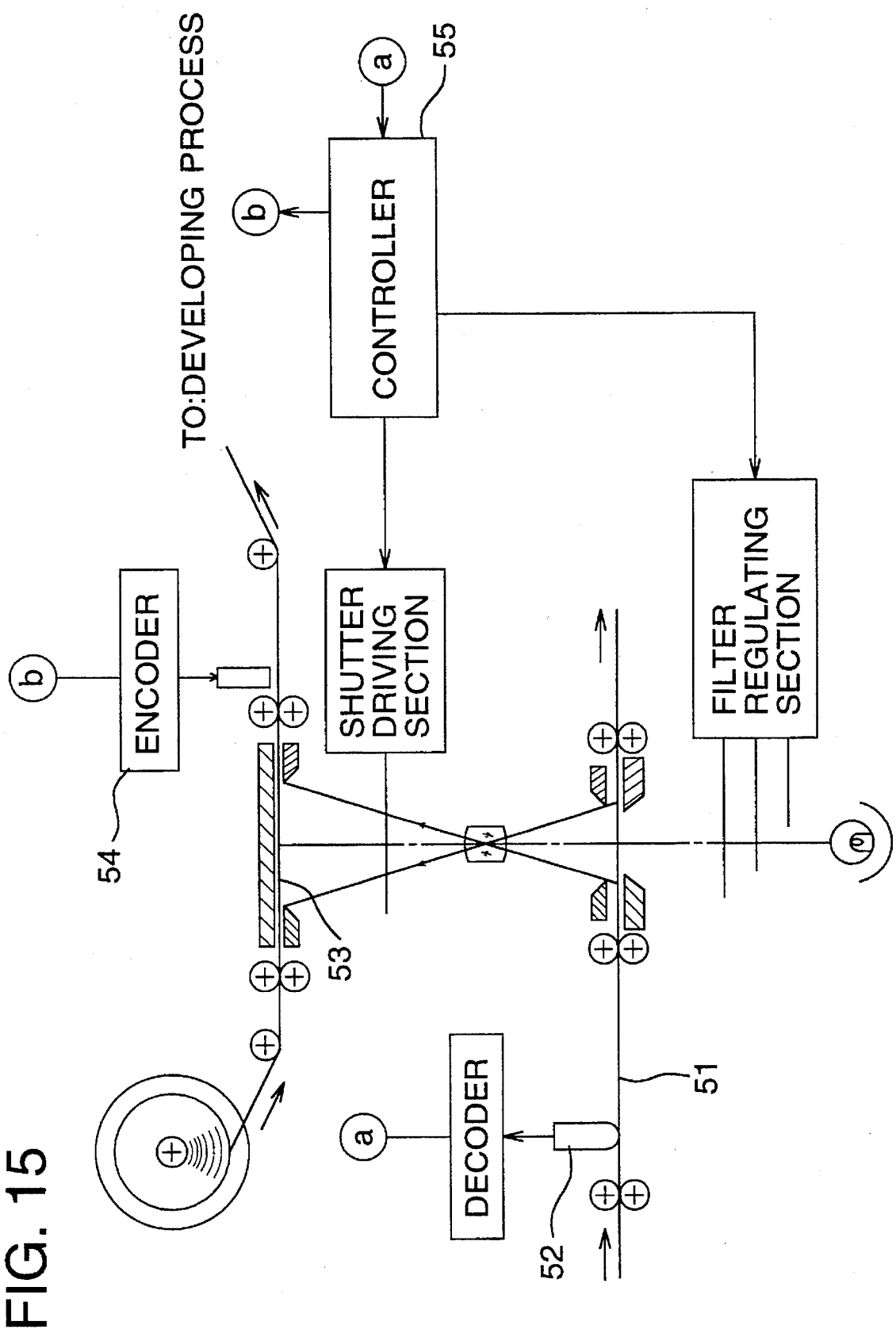
FIG. 15 is a schematic diagram showing an example of a printing device.

FIG. 15 is an example of a constitution of a printer which prints images of photographed frames of developed photographic films on a paper.

Photographic film 51 which has been developed is conveyed to the exposure section, where the film is subjected to exposure one frame by one so that latent images of photographed frame are formed on papers. After that, the papers on which latent images are formed are conveyed to the developing section for developing.

The numeral 52 represents a magnetic head. It is positioned close to the conveyance path of a photographic film. The information about inspection and verification recorded on the information recording area 5 on the photographic film shown in FIG. 1 are read by this magnetic head 52 and inputted into control section 55.

The numeral 54 is printing head, which is positioned close to the conveyance path of a paper. Printing head 54 prints customer's code and the like on the rear of the paper based on the information about inspection and verification outputted from control section 55.

As printing head 54, an ink jet printer and a thermosensitive transfer printer are used. The information about inspection and verification can be printed in the form of a bar code as well as letters including numbers.

Figure 11:
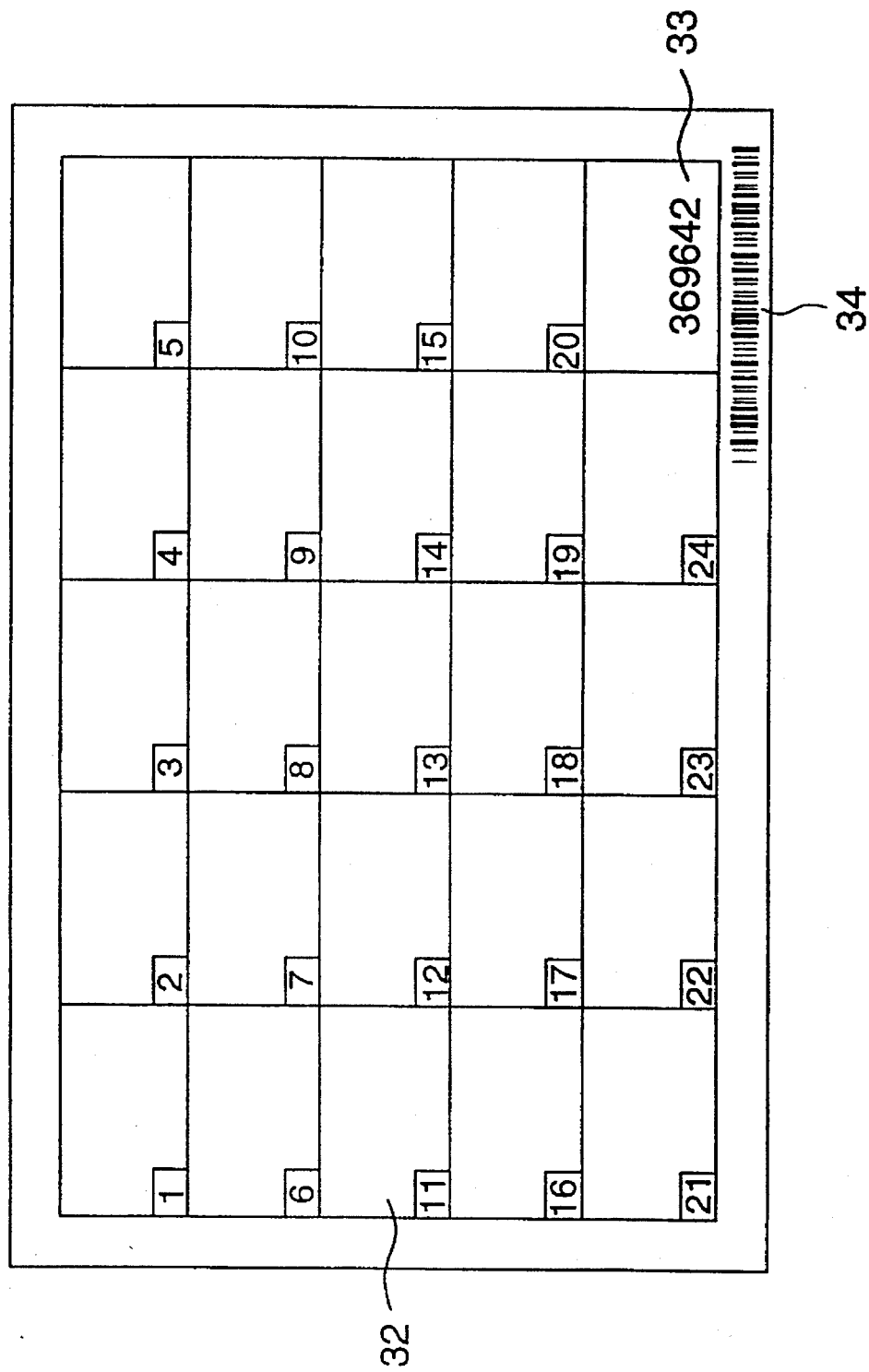
FIG. 11 is a plan view of an index print.

As can be understood from the constitution in FIG. 15, customer's code and the like can be printed on an index print sheet as shown in FIG. 11 based on the information about inspection and verification outputted from control section 55 in the same manner as above.

In addition, a magnetic head and a printing head can be positioned independently from the above-mentioned printer. For example, they can be used in connection with a receiver shown in FIG. 7.

According to the invention, it was possible to provide a photographic processing system in which not only every laboratory can improve the working efficiency and prevent an erroneous photographic process, but also every customer can satisfy to receive any various photographic print, to have an improved reflection of his photographing intention, to know a clear photographic processing charge and to readily placing his order for making a reprint.

What is claimed is:

1. A system for handling a roll of photographic film upon an order of a customer, the film including an information recording layer and a plurality of photographed frames, comprising:

input means for recording on the information recording layer of the roll of film a customer code that identifies the customer and a printing specification;

processing means for developing the film, for printing an image of each photographed frame on a photographic paper in accordance with the printing specification of the customer, for printing all images of the plurality of photographed frames on an index-print sheet, and for printing the customer code on the index-print sheet;

means for storing a plurality of the rolls of developed film, wherein each roll of developed film retains the customer code on its information recording layer and is stored as a roll of developed film without being divided into smaller film strips;

means for storing a plurality of the index-print sheets, each stored index-print sheet corresponding to a different one of the stored film rolls; and inspection/verification means for reading the customer code and the printing specification from a selected one of the rolls of developed film to identify the customer, the inspection/verification means controlling the processing means to reprint an image from a frame of the selected roll of film onto a photographic paper in accordance with the printing specification.

2. The system of claim 1, wherein the information recording layer includes a customer data recording layer and a photographing data recording layer.

3. The system of claim 2, wherein the customer data recording layer is a magnetic recording layer.

4. The system of claim 2, wherein the photographing data recording layer is a photographic layer and is provided to each frame, and wherein photographing data are written on the photographing recording layer by exposure means of a camera.

5. The system of claim 1, further comprising calculation means for calculating a prospective sum to be paid by the customer on the basis of the printing specification.

6. The system of claim 1, further comprising control means for controlling the processing means and the inspection/verification means.

7. The system of claim 1, wherein the processing means also prints the customer code on the photographic paper.

8. A method of handling a roll of photographic film upon an order of a customer, the film including an information recording layer and a plurality of photographed frames, comprising the steps of:

inputting a customer code that identifies the customer and a printing specification for recording on the information recording layer of the film;

developing the film;

printing an image of each photographed frame on a photographic paper in accordance with the printing specification of the customer;

printing all images of the plurality of photographed frames on an index-print sheet;

printing the customer code on the index-print sheet;

storing a plurality of rolls of developed film wherein each roll of developed film retains the customer code on its information recording layer and is stored as a roll of developed film without being divided into smaller film strips;

reading the customer code and the printing specification from a selected one of the rolls of developed film, to identify the customer; and reprinting an image from a frame of the selected roll of developed film onto a photographic paper in accordance with printing specification read from the selected roll of developed film.

* * * * *